United States Patent [19]
Kump et al.

[11] Patent Number: 5,742,425
[45] Date of Patent: Apr. 21, 1998

[54] TECHNIQUE FOR ELECTRONICALLY STABILIZING THE OUPUTS OF ACOUSTOOPTIC DEVICES

[75] Inventors: John Kump, Hillsborough; Arron Campi, San Jose, both of Calif.

[73] Assignee: Crystal Technology, Inc., Palo Alto, Calif.

[21] Appl. No.: 789,316

[22] Filed: Jan. 23, 1997

Related U.S. Application Data

[63] Continuation of Ser. No. 709,999, Sep. 9, 1996.

[51] Int. Cl.$^6$ ................................................ G02F 1/11
[52] U.S. Cl. .......................... 359/285; 359/305; 359/298
[58] Field of Search .............................. 359/285, 298, 359/305, 308, 312, 287; 385/4, 16; 356/349, 352

[56] References Cited

U.S. PATENT DOCUMENTS

| | | | |
|---|---|---|---|
| 4,389,093 | 6/1983 | Jackson | 359/298 |
| 4,602,342 | 7/1986 | Gottlieb et al. | 359/308 |
| 5,008,851 | 4/1991 | Brandstetter et al. | 359/305 |
| 5,247,388 | 9/1993 | Anderson et al. | 359/287 |
| 5,363,221 | 11/1994 | Sutton et al. | 359/298 |
| 5,452,314 | 9/1995 | Aronson | 359/308 |

Primary Examiner—Loha Ben

[57] ABSTRACT

A technique of stabilizing the output of an acoustooptic modulator. A laser passes a light beam through the acoustooptic modulator. A driver circuit connects to a drive electrode of the acoustooptic modulator. RF generators deliver drive power at a first carrier frequency and compensation power at second and third carrier frequencies, one higher and the other lower than the first carrier frequency. The driver circuit modulates the drive power and the compensation power such that compensating acoustic energy induced in the acoustooptic modulator complements drive acoustic energy, and the spatial content of the drive acoustic energy. The combined drive power and the complementing compensating power maintain the spatial thermal energy distribution inside the acoustooptic modulator substantially constant. Consequently, beam steering and thermal ellipticity are stabilized and remain substantially constant throughout the operating range of the modulator.

17 Claims, 2 Drawing Sheets

TECHNIQUE FOR ELECTRONICALLY STABILIZING THE OUPUTS OF ACOUSTOOPTIC DEVICES

This is a continuation, of application Ser. No. 08/709.999 filed Sep. 9, 1996.

BACKGROUND OF THE INVENTION

1. Field of the Invention

The invention relates to optical systems, and more particularly, to techniques of electronically stabilizing an optical output of an acoustooptic device.

2. Description of the Prior Art

Acoustooptic devices have found important applications in the fields of optical communications and signal processing. Optical communication networks, optical imaging systems and laser control circuits represent a few of the many systems that use acoustooptic devices. Laser systems often employ acoustooptic devices as intensity modulators and beam deflectors.

Acoustooptic modulators employed in prior are laser systems usually comprise an electronically driven acoustic transducer fixed to a transparent optical medium through which a laser beam can pass. As a laser directs is beam at the transparent medium, a driver circuit applies radio frequency (RF) drive power to electrodes on the transducer. In response to the RF drive power, the transducer launches acoustic waves in the transparent medium, which diffract the propagating laser beam into one or more directions. In general, the frequency of the RF drive power can control the deflection angles of the exiting laser beams, while the magnitude of the RF drive power can control the intensity of the exiting laser beams.

Although prior art acoustooptic modulators have served the purpose, they have not proved entirely satisfactory for use in high-performance, high-resolution laser applications due to thermally induced instabilities of the diffracted laser beams. Specifically, difficulties have been experienced in stabilizing the direction and/or shape of high-precision laser beams as they exit from acoustooptic modulators. It has been demonstrated that these instabilities, which can be critical in many applications, result from variations in a spatial thermal energy distribution inside the acoustooptic modulator.

A critical design parameter of an acoustooptic modulator is its "pointing stabilizy." For proper operation of a laser system, an exiting laser beam should point in a predetermined direction. However, random variations in the spatial thermal energy distribution inside the acoustooptic modulator may cause the exiting laser beam to deflect from its intended pointing direction. In high performance laser systems, these unwanted beam deflections, referred to as "beam steering," can be unacceptable.

Random variations in the spatial thermal energy distribution may also cause significant deformations of the cross-sectional shapes of the exiting laser beams. In addition to being intensity modulated and pointed in a well-defined direction, an exiting laser beam should also maintain a well-defined cross-sectional shape, usually circular, over an operating range of an acoustooptic device. Deformations in the cross-sectional shape of propagating laser beams are generally referred to as "ellipticity," which measures unwanted departures from circularity. It is known that anisotropic effects in the transparent medium generally cause ellipticity. Ellipticity changes to a propagating laser beam can occur as a result of normal acoustooptic interaction. This ellipticity is usually constant and, therefore, controllable by the particular design of the device. However, random thermal heating of acoustooptic modulators often result in unpredictable anisotropic effects which cause unwanted "thermal ellipticity."

The spatial thermal energy distribution in an acoustooptic modulator is primarily a function of the RF drive power. In those instances where the RF drive power remains relatively constant, the induced spatial thermal energy distribution in the acoustooptic modulator also remains constant and, therefore, predictable. Consequently, with relatively constant amounts of drive power, the amount of beam steering and/or thermal ellipticity are predictable and do not pose a serious problem; system designers simply shape the input laser beam to account for these predictable effects. In other words, when the transfer function of an acoustooptic modulator is known, designers simply tailor the incident laser beam with conventional optics so that the exiting laser beam points in the appropriate direction and has the correct cross-sectional shape. During device operation, these beam characteristics usually remain stable as long as the drive power remains relatively constant.

In many acoustooptic modulators, however, transducer drive power can shift significantly from a low power to a high power o modulate the output intensity of an incident laser beam. Also, acoustooptic modulators often have an irregular duty cycle, resulting in random applications of drive power. Such variations in drive power can cause significant variations in the spatial thermal energy distribution of the modulator materials, which in turn can cause unwanted beam steering and/or thermal ellipticity. These instabilities can seriously degrade the efficiency of high-performance laser systems. Consequently, those concerned with the development of optical systems have recently recognized a need for techniques to stabilize beam steering and thermal ellipticity in acoustooptic modulators and other acoustooptic devices.

SUMMARY OF THE INVENTION

To satisfy the need in the art, the present invention provides a technique for powering an acoustooptic device such that beam steering and thermal ellipticity are stabilized and remain substantially constant throughout the operating range of the device. Specifically, through this inventive technique a light beam is passed through the acoustooptic device; electronic drive power is applied to the acoustooptic device to generate drive acoustic energy at a first frequency in the acoustooptic device so as to vary the propagation characteristics of the light beam; compensating power is applied to the device to generate compensating acoustic energy at a frequency different from the first frequency; and the compensating power is applied such that the compensating acoustic energy complements the drive acoustic energy, and the spatial content of the drive acoustic energy.

One aspect of the invention includes a technique of powering an acoustooptic device to modulate a propogating light beam. This technique involves: generating modulated drive acoustic energy at a first carrier frequency in the acoustooptic device to modulate and deflect the propogating light beam; generating compensating acoustic energy at a second carrier frequency greater than the first carrier frequency, and at a third carrier frequency less than the first carrier frequency; and modulating the compensating acoustic energies such that their sum complements the drive acoustic energy and its spatial content.

Another aspect of the invention includes an optical system which utilizes an acoustooptic device to vary the characteristics of a light beam. In that regard, a light source transmits the light beam to the acousooptic device. A radio-frequency driver is connected to the acoustooptic device and generates drive acoustic energy therein. A radio-frequency compensation device, also connected to the acousooptic device, generates compensating acoustic energy in the device that complements the drive acoustic energy.

Specifically, an acoustooptic device in the optical system has an input face, an output face and a drive electrode. An output of a light source has a beam output directed a the input face. A radio-frequency driver delivers drive power at a first carrier frequency. A modulating signal source delivers a modulation signal. A compensation device delivers compensating power at a carrier frequency different from the first carrier frequency. An electronic driver connects to the modulating signal source, the radio-frequency driver, the compensation device and the drive electrode. The driver modulates the drive power with the modulation signal and modulates the compensating power such that the modulated compensating power is the complement of the modulated drive power. The electronic driver drives the acoustooptic device with the modulated drive power and the modulated compensating power.

BRIEF DESCRIPTION OF THE DRAWINGS

The teachings of the present invention can be readily understood by considering the following detailed description in conjunction with the accompanying drawings, in which.

DETAILED DESCRIPTION OF THE PREFERRED EMBODIMENT

Figure 1:
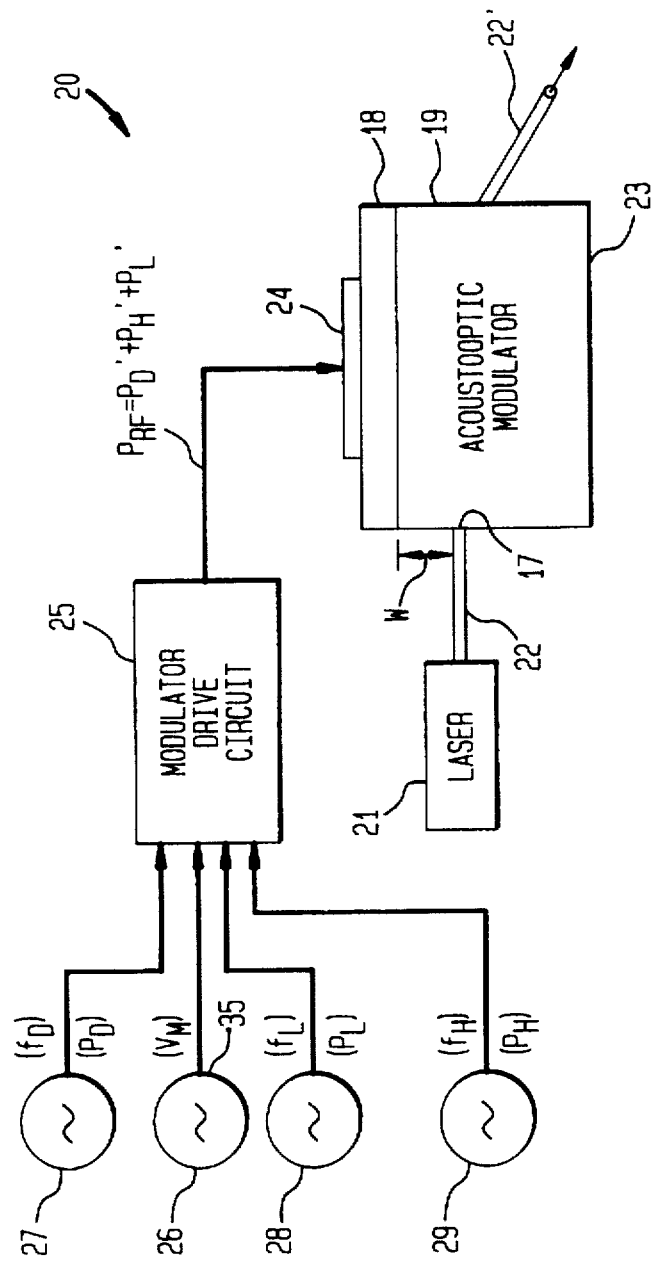
FIG. 1 is a block diagram of an optical system which conceptually illustrates a technique for electronically stabilizing the output of an acoustooptic modulator in accordance with the present invention.

Referring now to the drawings, FIG. 1 illustrates optical system 20 comprising conventional laser 21 and acoustooptic modulator 23. Acoustooptic modulator 23 includes drive electrode 24 fixed to acoustic transducer 18, e.g., a piezoelectric crystal, which is attached to transparent optical mdedium 19, e.g., an aniosotropic single crystal of tellurium-oxide, $TeO_2$. Laser 21 directs laser beam 22 at the input face of transparent optical medium 19. Incident laser beam 22 enters transparent optical medium 19 at aperture 17 spaced a distance "W" from the interface of acoustic transducer 18 and transparent optical medium 19. Modulator drive circuit 25 powers acoustooptic modulator 23 with radio-frequency (RF) power $P_{RF}$ applied to drive electrode 24. RF power $P_{RF}$ causes acoustic transducer 18 to launch ultrasonic waves in transparent optical medium 19, producing an acoustooptic interaction between propagating laser beam 22 and the ultrasonic waves which may diffract portions of laser beam 22 into one or more directions. FIG. 1 depicts an exiting laser beam 22', which represents one of the diffracted component beams of incident laser beam 22 as the diffracted beam exits transparent optical medium 19.

Signal source 26, a conventional information or data source, outputs modulating voltage $V_M$. Modulator drive circuit 25 powers acoustooptic modulator 23 with a combination of conventional RF drive power $P_D'$ and compensating RF power $P_H'$ and $P_L'$. RF generator 27 provides unmodulated RF drive power $P_D$ with drive carrier frequency $f_D$. RF generator 28 provides unmodulated compensating RF power $P_H$ with high carrier frequency $f_H$, which is greater than drive carrier frequency $f_D$. RF generator 29 provides unmodulated compensating RF power $P_L$ with low carrier frequency $f_L$, which is less than drive carrier frequency $f_D$. In a manner to be described below in detail with respect to FIG. 2, modulator drive circuit 25 modulates and combines the three RF carrier signals ($P_D$, $P_L$, $P_H$) to deliver constant RF power $P_{RF}$ as the sum of $P_D'$, $P_H'$ and $P_L'$.

As described above, frequencies $f_L$, $f_H$, and $f_D$, contained in RF power $P_{RF}$, control the deflection angles of exiting laser beams, of which laser beam 22' is one. Also, the magnitudes of the components of RF power $P_{RF}$ modulate the intensity of these deflected laser beams, including laser beam 22'. Additionally, the magnitude of RF power $P_{RF}$ primarily determines the spatial thermal energy distribution inside transparent optical medium 19. Therefore, acoustooptic modulator 23 must rely on variations in the electrical RF drive power at electrode 24 and the resulting acoustooptic effect to modulator the intensity of output laser beam 22'. However, the process of electronically driving acoustooptic modulator 23 with electrical RF power is inherently inefficient, producing thermal energy as well as acoustic energy in transparent optical medium 19. In particular, the spatial content of thermal energy in transparent optical medium 19 contains at least two components: a first component resulting from heat production at acoustic transducer 18 due to inefficient conversion of energy from RF power to acoustic energy; and a second component resulting from acoustic attenuation in transparent optical medium 19, which varies as a square of the acoustic wave frequency.

Optical system 20 electronically stabilizes beam steering and thermal ellipticity by driving acoustooptic modulator 23 with compensating power $P_H'$ and $P_L'$ such that the resulting compensating acoustic energy complements the drive acoustic energy resulting from RF drive power $P_D'$. By mixing two compensating acoustic fields, one having carrier frequency $f_L$ below drive frequency $f_D$, and the other having carrier frequency $f_H$ above drive frequency $f_D$, the spatial heating can be held constant without interfering with the characteristics of exiting laser beam 22'. Since acoustic attenuation varies as the square of the acoustic wave frequency, high frequency $f_H$ and low frequency $f_L$ are chosen to yield a ratio "S" as follows:

$$S = \frac{f_L^2 \cdot e^{-\alpha\tau L^2} - f_D^2 \cdot e^{-\alpha\tau D^2}}{f_D^2 \cdot e^{-\alpha\tau D^2} - f_H^2 \cdot e^{-\alpha\tau H^2}} ; \qquad (1)$$

where:

$$\tau = W/v; \qquad (2)$$

W is the distance from aperture 17 to the interface of acoustic transducer 18 and transparent optical medium 19;

α is the attentuation constant of transparent optical medium 19; and v is the velocity of sound in transparent optical medium 19.

Figure 2:
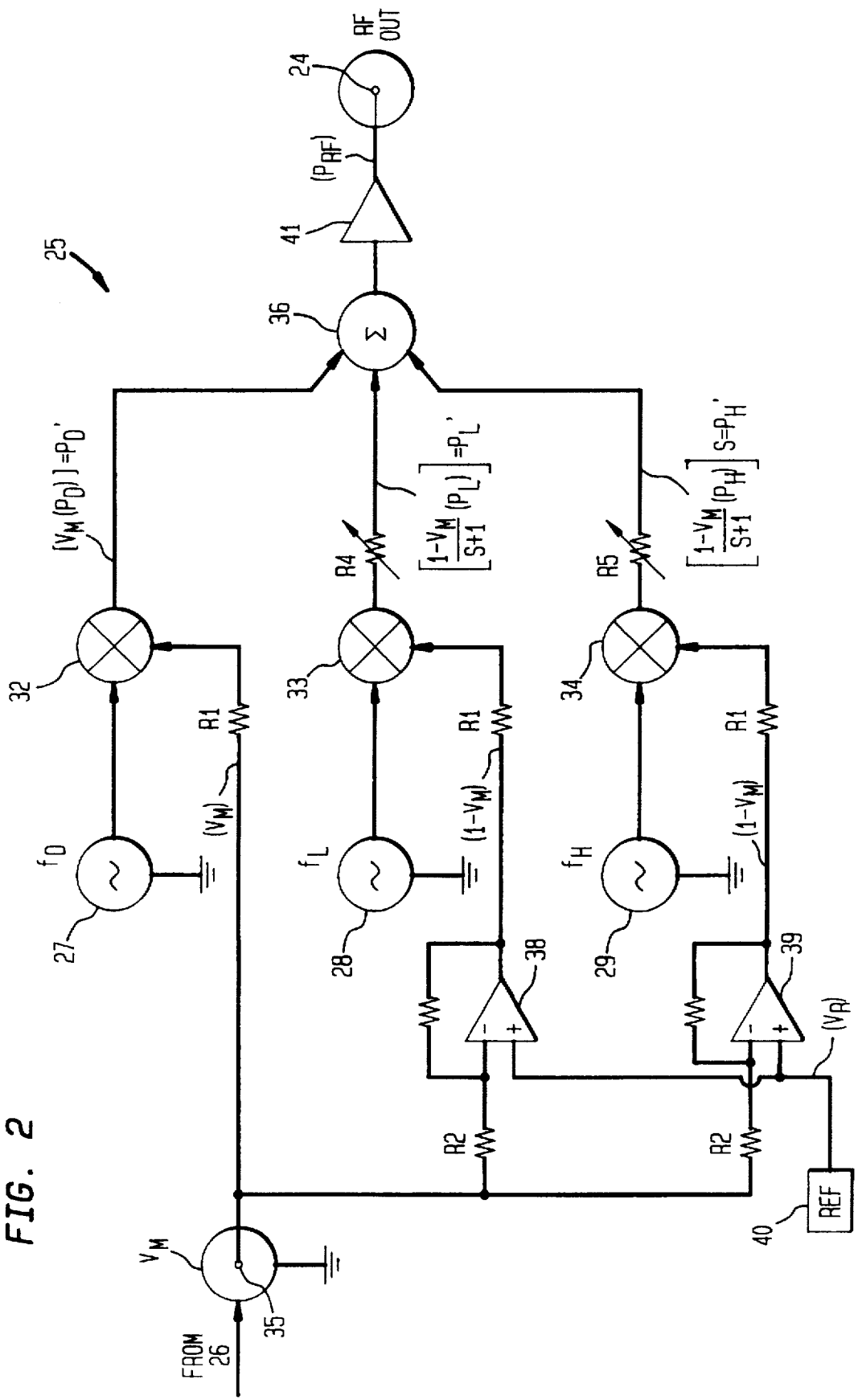
FIG. 2 is a schematic circuit diagram illustrating a detailed implementation of a drive circuit for powering the acoustooptic modulator employed in the FIG. 1 system.

With reference to FIG. 2, modulator drive circuit 25 includes three linearized modulators 32, 33 and 34. Input terminal 35, which connects to modulating signal source 26 (see FIG. 1), delivers modulating voltage $V_M$ to one input of modulator 32 (shown in FIG. 2) via input resistor R1. Modulating voltage $V_M$ represents a dimensionless quantity that varies between normalized values of +1 and zero. RF generator 27 delivers conventional RF drive power, with drive carrier frequency $f_D$ and power $P_D$, to another input of modulator 32. The output of modulator 32, which connects to an input of summer 36, comprises an amplitude modulated signal having a carrier frequency $f_D$ and drive power $P_D'$ equal to $V_M (P_D)$. As discussed above, carrier frequency $f_D$ will determine the deflection angle of the desired output laser beam 22' (see FIG. 1) while RF drive power $P_D'$ will modulator the intensity of beam 22'.

Input terminal 35, shown in FIG. 2, also connects to the inverting inputs of operational amplifiers 38 and 39 via two corresponding resistors R2. The noninverting inputs of operational amplifiers 38 and 39 connect in common to voltage reference 40, which delivers reference voltage $V_R$. Operational amplifiers 38 and 39, reference voltage $V_R$ and resistors R2 are chosen so that the operational amplifiers 38 and 39 each deliver a voltage substantially equal to $(1-V_M)$.

The output of operational amplifier 38 connects to one input of modulator 33 via resistor R1. RF generator 28 delivers compensating RF power, with low carrier frequency $f_L$ and power $P_L$, to the other input of mixer 33 The output of modulator 33 connects to an input of summer 36 via adjustable attenuator R4, which is adjusted to output an amplitude modulated signal having low carrier frequency $f_L$ and low-frequency compensating power $P_L'$ equal to $$\frac{1-V_M}{S+1} \cdot P_L.$$

The output of operational amplifier 39 connects to one input of modulator 34 via resistor R1. RF generator 29 delivers compensating RF power, with high carrier frequency $f_H$ and power $P_H$, to the other input of modulator 34. The output of modulator 34 connects to an input of summer 36 via adjustable attenuator R5, which is adjusted to output an amplitude modulated signal having high carrier frequency $f_H$ and high-frequency compensating power $P_H'$ equal to $$\frac{1-V_M}{S+1} \cdot S \cdot P_H.$$

Additionally, the inputs to linearized modulators 32, 33 and 34 are preferably equal to each other to have uniform performance. Therefor, the following expressions summarize the preferred relationships between powers $P_D$, $P_L$, $P_H$, $P_D'$, $P_L'$ and $P_H'$:

$$P_D = P_L = P_H; \tag{3}$$

$$P_D' = V_M \cdot P_D; \tag{4}$$

$$P_L' = \frac{1-V_M}{S+1} \cdot P_L; \tag{5}$$

$$P_H' = \frac{1-V_M}{S+1} \cdot S \cdot P_H; \tag{6}$$

The term $$\left(\frac{1-V_M}{S+1}\right)$$

establishes that the compensating power $(P_L', P_H')$ is the complement of the drive power $P_D'$. The ratio "S" establishes the relationship of the high-frequency compensating power $P_H'$ to the low-frequency compensating power $P_L'$.

Summer 36 feeds RF power amplifier 41 with the sum of its three inputs. The output of power amplifier 41 connects to electrode 24, powering acoustooptic modulator 23 with RF power $P_{RF}$ having carrier frequencies $f_D$, $f_L$ and $f_H$. The carrier frequencies $f_L$ and $f_H$, which correspond to the compensating power, will cause portions of incident laser beam 22 to be deflected into angles which differ from that of beam 22'. Also, the compensating power will modulator only those output laser beams associated with carrier frequencies $f_L$ and $f_H$, thereby having no effect on the intensity of beam 22'. RF power $P_{RF}$ remains constant, equaling the sum of the inputs to summer 36 as follows:

$$P_{RF} = P_D' + P_L' + P_H'; \tag{7}$$

which converts to:

$$P_{RF} = V_M(P_D) + \{(1-V_M)/(S+1)\}(P_L) + \{(1-V_M)/(S+1)\}(P_H)S. \tag{8}$$

As can be seen from equation (8), when modulating voltage $V_M$ increases, the contribution of the compensating powers to RF power $P_{RF}$ decreases proportionally. Conversely, when modulating voltage $V_M$ decreases, the contribution of the compensating powers to RF power $P_{RF}$ increases proportionally. This complementing technique results in maintaining a constant level of acoustic energy in acoustooptic modulator 23, thereby stabilizing beam steering and thermal ellipticity.

For example and with reference to FIG. 2 and equation (8) when modulating voltage $V_M$ equals +1 (the maximum value), the output power of modulators 33 and 34 each equal zero and RF power $P_{RF}$ equals $P_D$. When modulating voltage $V_M$ equals zero (the minimum value), the output power of mixer 32 equals zero, the output power of attenuator R4 equals $$\frac{P_L}{S+1},$$

the output power of attenuator R5 equals $$\frac{S \cdot P_H}{S+1}.$$

Consequently, by choosing the compensating power levels in accordance with the above teachings, the spatial thermal energy distribution inside acoustooptic modulator 23 remains substantially constant. As such, beam steering and thermal ellipticity will remain substantially constant. As explained above, when beam steering and thermal ellipticity remain constant over the operating range, system designers may shape incident laser beam 22 so that exiting laser beam 22' points in the appropriate direction and has the correct cross-sectional shape. These beam characteristics will stabilize because RF power $P_{RF}$ remains constant.

Obviously many modifications and variations of the present invention are possible in the light of the above teachings. For example, the embodiment of FIGS. 1 and 2 show optical system 20 comprising only two compensating power sources, viz., RF generators 28 and 29. Although two sources of compensating power having frequencies properly spaced on either side of the conventional RF drive frequency suffices for most applications, those skilled in he art will recognize that a larger number of compensating power sources may also be used when necessary. Additionally, in cases where less stringent stability control over beam steering and thermal ellipticity exist, a simpler single-frequency compensating power source may be used. Of course, in the single-frequency case, equation (1) does not apply and the spatial content of thermal energy in acoustooptic modulator 23 will be less than optimum.

7

It is to be understood, therefore, that within the scope of the appended claims, the invention may be practiced otherwise than as specifically described.

What is claimed is:

1. A method of stabilizing the output of an acoustooptic device comprising:
    passing a light beam through said acoustooptic device;
    applying electronic drive power to said acoustooptic device for generating drive acoustic energy at a first frequency in said acoustooptic device to vary the propagation characteristics of said light beam;
    applying compensating power to said acoustooptic device for generating compensating acoustic energy at a frequency different from said first frequency; and
    varying said compensating power such that said compensating acoustic energy at least partially complements said drive acoustic energy and the spatial content of said drive acoustic energy.

2. The method of claim 1 further including modulating said electronic drive power with a first modulation signal and modulating said compensating power with a second modulation signal derived from said first modulating signal such that said compensating acoustic energy complements said drive acoustic energy and the spatial content of said drive acoustic energy.

3. The method of claim 2 wherein said step of applying compensating power includes generating compensating acoustic energy having a plurality of spaced frequencies different from said first frequency.

4. The method of claim 3 wherein said step of applying compensating power includes generating compensating acoustic energy having a second frequency greater than said first frequency and a third frequency less than said first frequency.

5. The method of claim 4 wherein said steps of applying electronic drive power and applying compensating power include applying power such that the following relationships apply:

$$P_{RF} = P_D{'} + P_L{'} + P_H{'};$$

$$P_D{'} = V_M \cdot P_D;$$

$$P_L{'} = \frac{1 - V_M}{S + 1} \cdot P_L;$$

$$P_H{'} = \frac{1 - V_M}{S + 1} \cdot S \cdot P_H;$$

$$S = \frac{f_L^2 \cdot e^{-\alpha \tau L^2} - f_D^2 \cdot e^{-\alpha \tau D^2}}{f_D^2 \cdot e^{-\alpha \tau D^2} - f_H^2 \cdot e^{-\alpha \tau H^2}};$$

$$\tau = W/v;$$

where:
    $f_D$ is said first frequency;
    $f_H$ is said second frequency;
    $f_L$ is said third frequency;
    $P_D{'}$ is said electronic drive power;
    $P_H{'}$ is a component of said compensating power at said second frequency $f_H$;
    $P_L{'}$ is a component of said compensating power at said third frequency $f_L$;
    $P_D$ is the unmodulated portion of $P_D{'}$;
    $P_H$ is the unmodulated portion of $P_H{'}$;
    $P_L$ is the unmodulated portion of $P_L{'}$;
    $V_M$ is said first modulation signal;

8

$\alpha$ is the attenuation constant of said acoustooptic device;
    $v$ is the velocity of sound in said acoustooptic device; and
    W is the distance in said acoustooptic device between said light beam and the point said drive power is applied to said acoustooptic device.

6. A method of powering an acoustooptic device to modulator a propagating light beam comprising:
    generating modulated drive acoustic energy at a first carrier frequency in said acoustooptic device to modulator and deflect said propagating light beam;
    generating compensating acoustic energy at a second carrier frequency greater than said first carrier frequency;
    generating compensating acoustic energy at a third carrier frequency less than said first carrier frequency; and
    modulating said compensating acoustic energies such that their sum complements said modulated drive acoustic energy and its spatial content.

7. The method of claim 6 further including modulating said compensating acoustic energies with a modulating signal derived from the modulation of said drive acoustic energy such that said compensating acoustic energies complement said drive acoustic energy and its spatial content.

8. The method of claim 7 wherein said generating steps include applying power to said acoustooptic device such that the following relationships apply:

$$P_{RF} = P_D{'} + P_L{'} + P_H{'};$$

$$P_D{'} = V_M \cdot P_D;$$

$$P_L{'} = \frac{1 - V_M}{S + 1} \cdot P_L;$$

$$P_H{'} = \frac{1 - V_M}{S + 1} \cdot S \cdot P_H;$$

$$S = \frac{f_L^2 \cdot e^{-\alpha \tau L^2} - f_D^2 \cdot e^{-\alpha \tau D^2}}{f_D^2 \cdot e^{-\alpha \tau D^2} - f_H^2 \cdot e^{-\alpha \tau H^2}};$$

$$\tau = W/v;$$

where:
    $f_D$ is said first carrier frequency;
    $f_H$ is said second carrier frequency;
    $f_L$ is said third carrier frequency;
    $P_D{'}$ is the modulated power applied to generate said drive acoustic energy;
    $P_H{'}$ is the modulated power applied to generate said compensating acoustic energy at said second carrier frequency $f_H$;
    $P_L{'}$ is the modulated power applied to generate said compensating acoustic energy at said third carrier frequency $f_L$;
    $P_D$ is the unmodulated portion of $P_D{'}$;
    $P_H$ is the unmodulated portion of $P_H{'}$;
    $P_L$ is the unmodulated portion of $P_L{'}$;
    $V_M$ is a modulating signal;
    $\alpha$ is the attenuation constant of said acoustooptic device;
    $v$ is the velocity of sound in said acoustooptic device; and
    W is the distance in said acoustooptic device between said light beam and the point of said applying power to said acoustooptic device.

9. An optical system for varying the characteristics of a light beam comprising:

an acoustooptic device;

a light source having means for passing said light beam through said acoustooptic device;

a radio-frequency drive means connected to said acoustooptic device for generating drive acoustic energy in said acoustooptic device; and a radio-frequency compensation means connected to said acoustooptic device for generating compensating acoustic energy in said acoustooptic device that at least partially complements said drive acoustic energy.

10. The optical system of claim 9 wherein said light source includes a laser.

11. The optical system of claim 10 further including a modulating means connected to said radio-frequency drive means and said radio-frequency compensation means for modulating said drive acoustic energy and for modulating said compensating acoustic energy to generate the complement of said drive acoustic energy.

12. The optical system of claim 11 wherein said drive acoustic energy has a first carrier frequency $f_D$ and said radio-frequency compensation means generates compensating acoustic energy having a plurality of spaced carrier frequencies different from said first carrier frequency.

13. The optical system of claim 12 wherein said radio-frequency compensation means generates compensating acoustic energy having a second carrier frequency $f_H$ greater than said first carrier frequency $f_D$ and a third carrier frequency $f_L$ less than said first carrier frequency.

14. The optical system of claim 13 wherein said radio-frequency drive means delivers modulated electronic drive power $P_D'$ at said first carrier frequency $f_D$, said radio-frequency compensation means delivers modulated compensating power $P_H'$ said second carrier frequency $f_H$, and modulated compensating power $P_L'$ at said third carrier frequency $f_L$ such that the following relationships apply:

$$P_{RF} = P_D' + P_L' + P_H';$$

$$P_D' = V_M \cdot P_D;$$

$$P_L' = \frac{1 - V_M}{S + 1} \cdot P_L;$$

$$P_H' = \frac{1 - V_M}{S + 1} \cdot S \cdot P_H;$$

$$S = \frac{f_L^2 \cdot e^{-\alpha v f_L^2} - f_D^2 \cdot e^{-\alpha v f_D^2}}{f_D^2 \cdot e^{-\alpha v f_D^2} - f_H^2 \cdot e^{-\alpha v f_H^2}};$$

$$\tau = W/v;$$

where:

$P_D$ is the unmodulated portion of $P_D'$;

$P_H$ is the unmodulated portion of $P_H'$;

$P_L$ is the unmodulated portion of $P_L'$;

$V_M$ is a modulating signal;

$\alpha$ is the attenuation constant of said acoustooptic device;

$v$ is the velocity of sound in said acoustooptic device; and $W$ is the distance in said acoustooptic device between said light beam and the point that the acoustic energies are generated.

15. An optical system for modulating a laser beam with acoustic energy comprising:

an acoustooptic modulator having an input face, an output face and a drive electrode;

a laser having an output directed at said input face;

a radio-frequency (RF) drive means for generating RF drive power at a first carrier frequency;

a modulating means for generating a modulation signal;

an RF compensation means for generating RF compensating power at a carrier frequency different from said first carrier frequency; and an electronic driver means connected to said modulating means, said RF drive means, said RF compensation means and said drive electrode, for modulating said RF drive power with said modulation signal to form modulated RF drive power, for modulating said RF compensating power to form modulated RF compensating power such that it is the complement of said modulated RF drive power, and for driving said acoustooptic modulator with said modulated RF drive power and said modulated RF compensating power.

16. The optical system of claim 15 wherein said RF compensation means generates said RF compensating power having a second carrier frequency greater than said first carrier frequency and a third carrier frequency less than said first carrier frequency.

17. The optical system of claim 16 wherein said RF drive means generates said RF drive power and said RF compensation means generates said RF compensating power such that the following relationships apply:

$$P_{RF} = P_D' + P_L' + P_H';$$

$$P_D' = V_M \cdot P_D;$$

$$P_L' = \frac{1 - V_M}{S + 1} \cdot P_L;$$

$$P_H' = \frac{1 - V_M}{S + 1} \cdot S \cdot P_H;$$

$$S = \frac{f_L^2 \cdot e^{-\alpha v f_L^2} - f_D^2 \cdot e^{-\alpha v f_D^2}}{f_D^2 \cdot e^{-\alpha v f_D^2} - f_H^2 \cdot e^{-\alpha v f_H^2}};$$

$$\tau = W/v;$$

where:

$f_D$ is said first carrier frequency;

$f_H$ is said second carrier frequency;

$f_L$ is said third carrier frequency;

$P_D'$ is said modulated RF drive power;

$P_H'$ is said modulated RF compensating power at said second carrier frequency $f_H$;

$P_L'$ is said modulated RF compensating power at said third carrier frequency $f_L$;

$P_D$ is the unmodulated portion of $P_D'$;

$P_H$ is the unmodulated portion of $P_H'$;

$P_L$ is the unmodulated portion of $P_L'$;

$V_M$ is said modulation signal;

$\alpha$ is the attenuation constant of said acoustooptic modulator;

$v$ is the velocity of sound in said acoustooptic modulator; and $W$ is the distance in said acoustooptic modulator between said laser beam and the point that said acoustic energy is launched in said acoustooptic modulator.

* * * * *

UNITED STATES PATENT AND TRADEMARK OFFICE
CERTIFICATE OF CORRECTION

PATENT NO. : 5,742,425
DATED : April 21, 1998
INVENTOR(S): John Kump and Arron Campi It is certified that error appears in the above-identified patent and that said Letters Patent is hereby corrected as shown below:

On the title page, Item [54] and Col. 1, line 1:
In the title, cancel "OUPUTS" and insert --OUTPUTS--;

Column 1, line 25, cancel "is" and insert --it's--;

Column 2, line 25, cancel "o" and insert --to--;

Column 6, lines 13 - 15 that portion of the formula reading "(S=1)" should read --(S+1)--

Signed and Sealed this

First Day of September, 1998

*Attest:*

BRUCE LEHMAN

*Attesting Officer*  *Commissioner of Patents and Trademarks*